United States Patent
Bentley

(10) Patent No.: US 7,448,694 B1
(45) Date of Patent: Nov. 11, 2008

(54) RIM AND HUBCAP PROTECTOR

(76) Inventor: LaVern Bentley, 6743 Kinnerton Dr., Indianapolis, IN (US) 46254

(*) Notice: Subject to any disclaimer, the term of this patent is extended or adjusted under 35 U.S.C. 154(b) by 0 days.

(21) Appl. No.: 11/654,091

(22) Filed: Jan. 16, 2007

(51) Int. Cl.
B60B 7/04 (2006.01)
B60B 7/08 (2006.01)

(52) U.S. Cl. .............. 301/37.103; 301/37.104; 118/504

(58) Field of Classification Search .......... 301/37.103, 301/37.104; 160/132, 134; 220/821, 822; 118/504, 505
See application file for complete search history.

(56) References Cited

U.S. PATENT DOCUMENTS

| | | | | | |
|---|---|---|---|---|---|
| 490,532 | A | * | 1/1893 | Baer | 416/73 |
| 519,554 | A | * | 5/1894 | Rubin | 416/73 |
| 602,967 | A | * | 4/1898 | Wells | 160/134 |
| 745,964 | A | * | 12/1903 | Koslopsky | 220/821 |
| 1,533,396 | A | * | 4/1925 | Dabney | 416/73 |
| 2,864,092 | A | * | 12/1958 | Hurst | 2/171.03 |
| 2,969,142 | A | * | 1/1961 | Mack | 401/59 |
| 3,683,825 | A | * | 8/1972 | Sheldon | 108/33 |
| 4,196,692 | A | * | 4/1980 | Vanstrom | 118/504 |
| 4,792,191 | A | * | 12/1988 | Farmer | 301/37.102 |
| 5,967,161 | A | * | 10/1999 | Neal | 135/19.5 |
| 6,485,106 | B1 | * | 11/2002 | Hermansen et al. | 301/37.103 |
| 6,905,177 | B1 | * | 6/2005 | Murillo | 301/37.103 |

* cited by examiner

Primary Examiner—Russell D Stormer

(57) ABSTRACT

A rim and hubcap protector is disclosed. An illustrative embodiment of the rim and hubcap protector includes a housing and a plurality of protector sections rotatably carried by the housing. The protector sections are capable of deployment between an extended configuration and a collapsed configuration.

3 Claims, 3 Drawing Sheets

RIM AND HUBCAP PROTECTOR

FIELD

The present invention relates to devices for protecting rims and hubcaps of automobiles from cleaning agents. More particularly, the present invention relates to a multi-sectional rim and hubcap protector which can be folded or collapsed for storage.

BACKGROUND

During the washing and waxing of an automobile or of automobile tires, it is frequently desirable to cover the rims and hubcaps on the wheels of the automobile in order to protect the rims and hubcaps from coating or cleaning chemicals. Conventional rim and hubcap protectors, however, are typically incapable of being folded or collapsed for space-efficient storage. Therefore, a rim and hubcap protector which is capable of being folded or collapsed when not in use is needed.

SUMMARY

The present invention is generally directed to a rim and hubcap protector. An illustrative embodiment of the rim and hubcap protector includes a rim and hubcap protector is disclosed. An illustrative embodiment of the rim and hubcap protector includes a housing and a plurality of protector sections rotatably carried by the housing. The protector sections are capable of deployment between an extended configuration and a collapsed configuration.

BRIEF DESCRIPTION OF THE DRAWINGS

The invention will now be described, by way of example, with reference to the accompanying drawings, in which.

DETAILED DESCRIPTION

Figure 1:
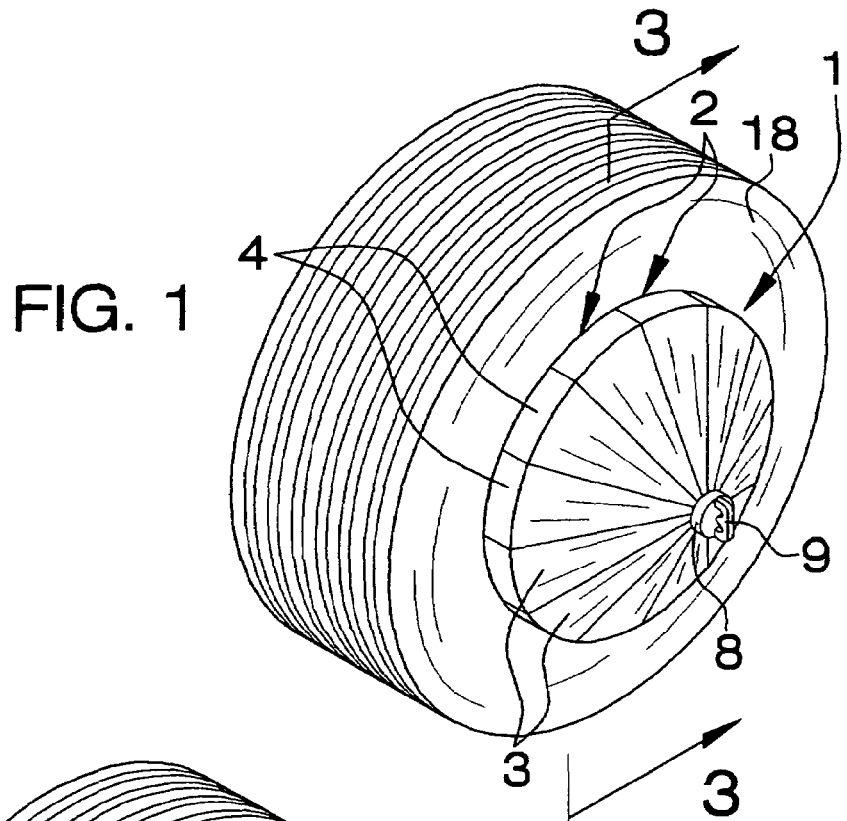
FIG. 1 is a perspective view of an automobile wheel, with an illustrative embodiment of the rim and hubcap protector placed over a rim (not shown) of the wheel in typical application of the rim and hubcap protector.

Referring to the drawings, an illustrative embodiment of the rim and hubcap protector, hereinafter protector, is generally indicated by reference numeral 1. The protector 1 has a generally circular shape and includes multiple protector sections 2. Each of the protector sections 2 is typically plastic, although metal or suitable alternative materials may be used. Each protector section 2 includes a generally elongated, triangular main portion 3; and a generally curved, rectangular flange portion 4 which extends from the main portion 3. The flange portion 4 is disposed at a generally obtuse degree angle with respect to the plane of the main portion 3 of each protector section 2.

Figure 4:
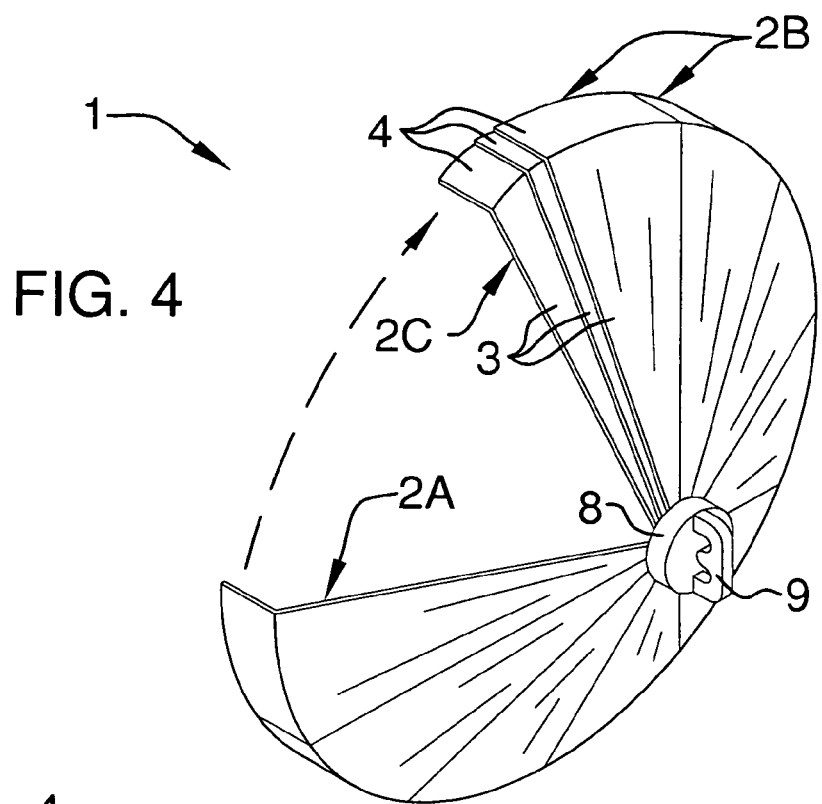
FIG. 4 is a front perspective view of an illustrative embodiment of the rim and hubcap protector, illustrating initial folding of the rim and hubcap protector from an extended, functional configuration to a folded, storage configuration.
Figure 5:
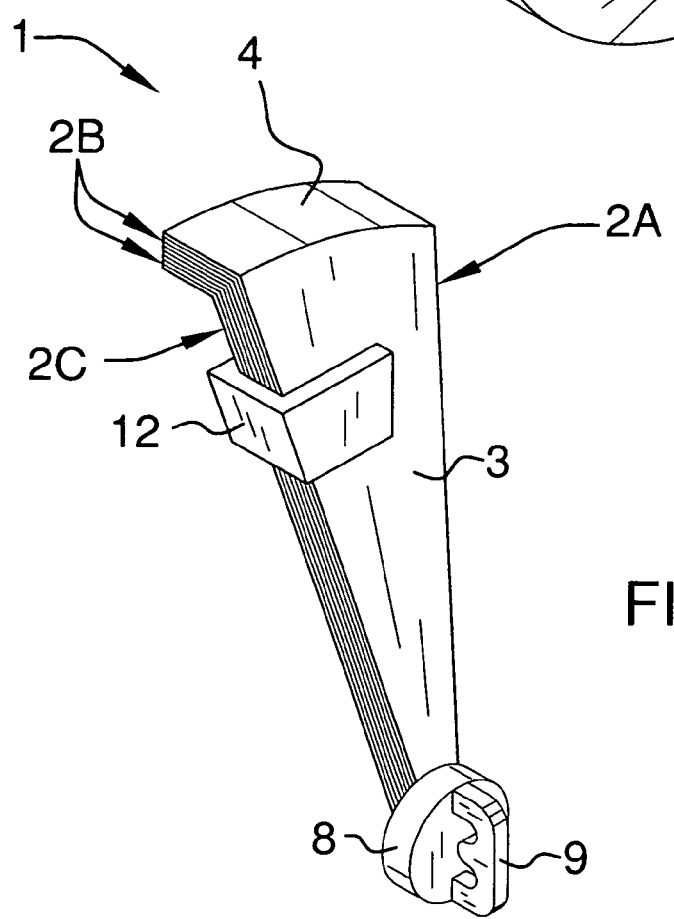
FIG. 5 is a perspective view of an illustrative embodiment of the rim and hubcap protector, shown in a fully-collapsed or folded configuration.

As illustrated in FIGS. 4 and 5, the protector sections 2 include a large terminal protector section 2a; a small terminal protector section 2c; and multiple adjacent middle protector sections 2b. Accordingly, the main portion 3 and flange portion 4 of the large terminal protector section 2a have a greater area than the main portion 3 and flange portion 4, respectively, of each of the middle protector sections 2b and the small terminal protector section 2c. Similarly, the areas of the main portion 3 and flange portion 4 of the middle protector sections 2b become progressively larger from the small terminal protector section 2c to the large terminal protector section 2a.

Figure 2:
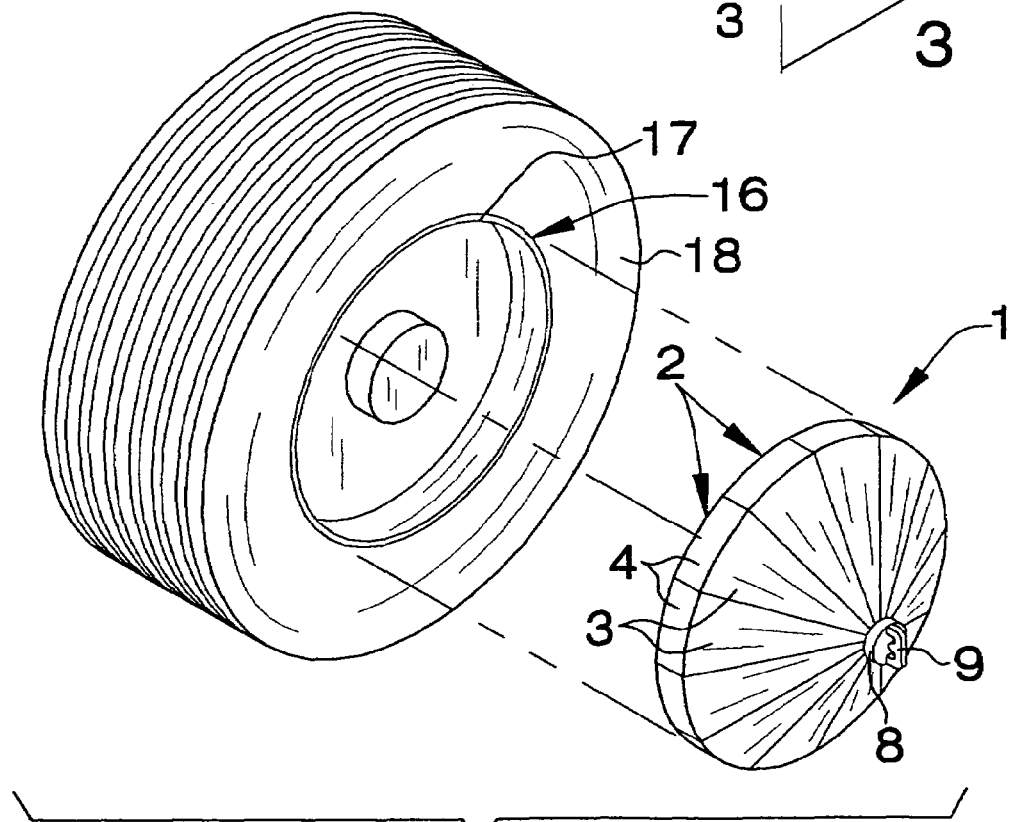
FIG. 2 is an exploded, perspective view illustrating placement of the rim and hubcap protector over a rim of the wheel.

At least one of the large terminal protector section 2a and the small terminal protector section 2c, as well as each of the middle protector sections 2b, is rotatably mounted in a housing 8. Accordingly, as shown in FIGS. 1 and 2, the large terminal protector section 2a, the small terminal protector section 2c and the middle protector sections 2b are capable of being deployed in a fanned-out, spreaded or extended position, in which the protector sections 2 are deployed in adjacent relationship with respect to each other and impart a generally conical shape to the protector 1. Conversely, the protector sections 2 are capable of being deployed in a folded or collapsed configuration in which the protector sections 2 are rotated with respect to the housing 8 and each protector section 2 is nested in the adjacent protector section 2 of larger size, as shown in FIG. 5. A U-shaped clamp 12 can be extended around the protector sections 2 to maintain the protector sections 2 in the folded position. In FIG. 4, the small terminal protector section 2c is nested in the adjacent middle protector section 2b, which is likewise nested in the adjacent middle protector section 2b. A handle 9 is typically provided on the housing 8.

Figure 3:
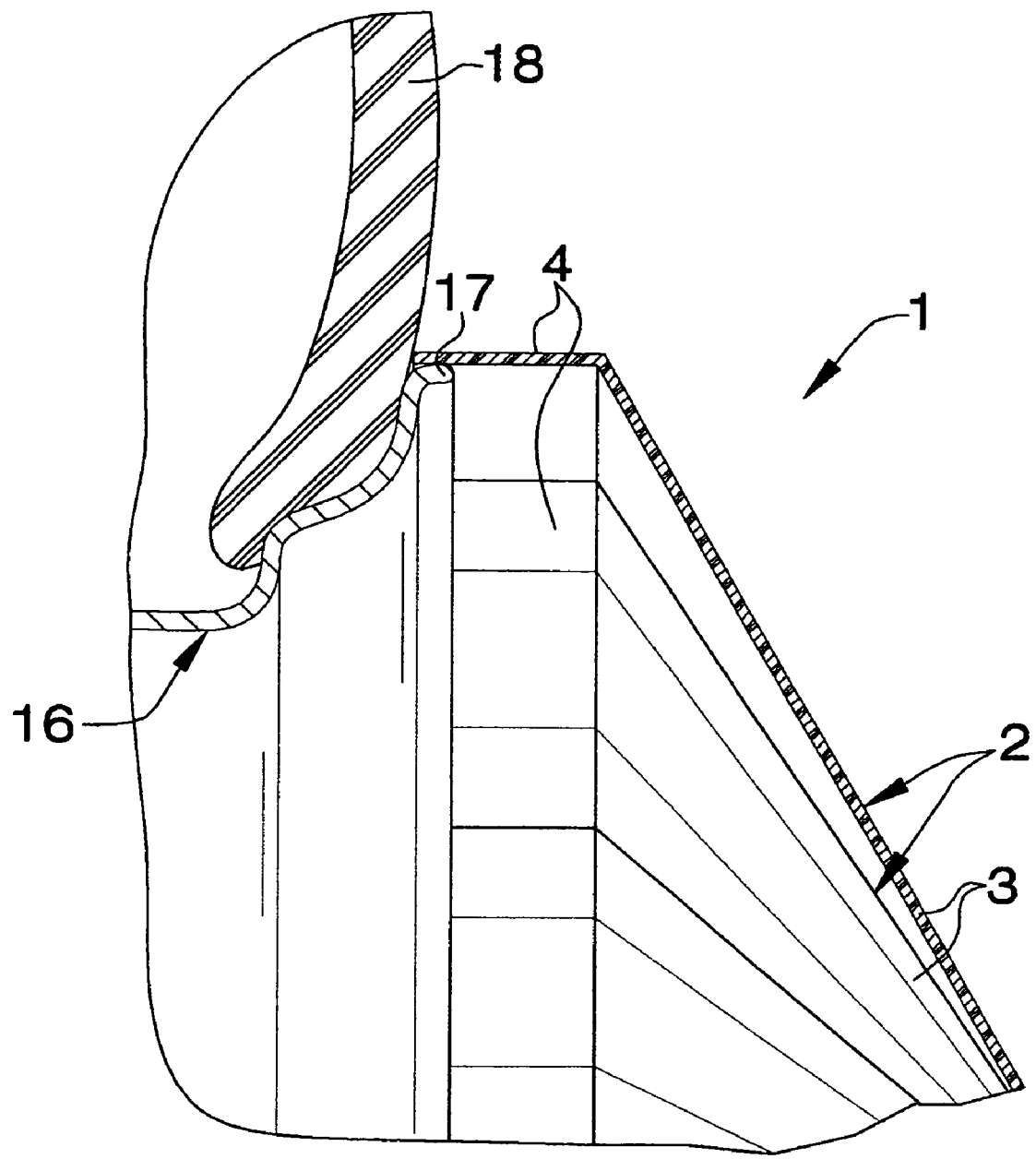
FIG. 3 is a sectional view, taken along section lines 3-3 in FIG. 2.

As shown in FIGS. 1-3, in typical use, the protector 1 is deployed in the extended, fanned-out, functional configuration and placed over a wheel rim 17 of an automobile wheel 16. A tire 18 is mounted on the wheel rim 17. As shown in FIG. 3, the flange portion 4 of each section 2 receives the exterior portion of the wheel rim 17 and engages the tire 18. Accordingly, the sections 2 of the protector 1 cover the entire rim 17 and any hubcap (not shown) which may be mounted in the wheel rim 17. Clamps (not shown) may be provided on the protector 1 to facilitate attachment of the protector 1 to the automobile wheel 16. The protector 1 remains on the wheel rim 17 during the washing and/or waxing of an automobile (not shown) of which the automobile wheel 16 is a part or during the washing and/or coating of the tire 18 and prevents washing chemicals and/or coatings from inadvertently falling on the wheel rim 17.

After use, the protector 1 is removed from the wheel rim 17 of the automobile wheel 16. The protector 1 is folded or collapsed as the sections 2 are rotated with respect to the housing 8 and each section 2 is nested in the adjacent section 2, as shown in FIG. 5. This facilitates space-efficient storage of the protector 1 when not in use.

While the preferred embodiments of the invention have been described above, it will be recognized and understood that various modifications can be made in the invention and the appended claims are intended to cover all such modifications which may fall within the spirit and scope of the invention.

What is claimed is:

1. A rim and hubcap protector, comprising:
   a housing;
   first and second terminal protector sections carried by said housing, at least one of said first and second terminal protector sections rotatably carried by said housing;

a plurality of adjacent middle protector sections rotatably carried by said housing between said first and second terminal protector sections;

wherein each of said first terminal protector section, said second terminal protector section and said plurality of middle protector sections includes a generally elongated, triangular main portion and a generally curved flange portion carried by said main portion;

wherein said main portion and said flange portion of said first terminal protector section are greater in area than said main portion and said flange portion of said second terminal protector section;

wherein said main portion and said flange portion of said middle protector sections progressively increase in area from said first terminal protector section to said second terminal protector section; and wherein said first terminal protector section, said second terminal protector section and said plurality of middle protector sections are capable of deployment between an extended configuration and a collapsed configuration.

2. The rim and hubcap protector of claim 1 further comprising a handle carried by said housing.

3. The rim and hubcap protector of claim 1 wherein said flange portion is disposed at a generally obtuse angle with respect to said main portion.

* * * * *